Jan. 16, 1940.  G. A. JOHNSON  2,187,156
SHOCK ABSORBING MECHANISM
Filed Dec. 24, 1937  2 Sheets-Sheet 1
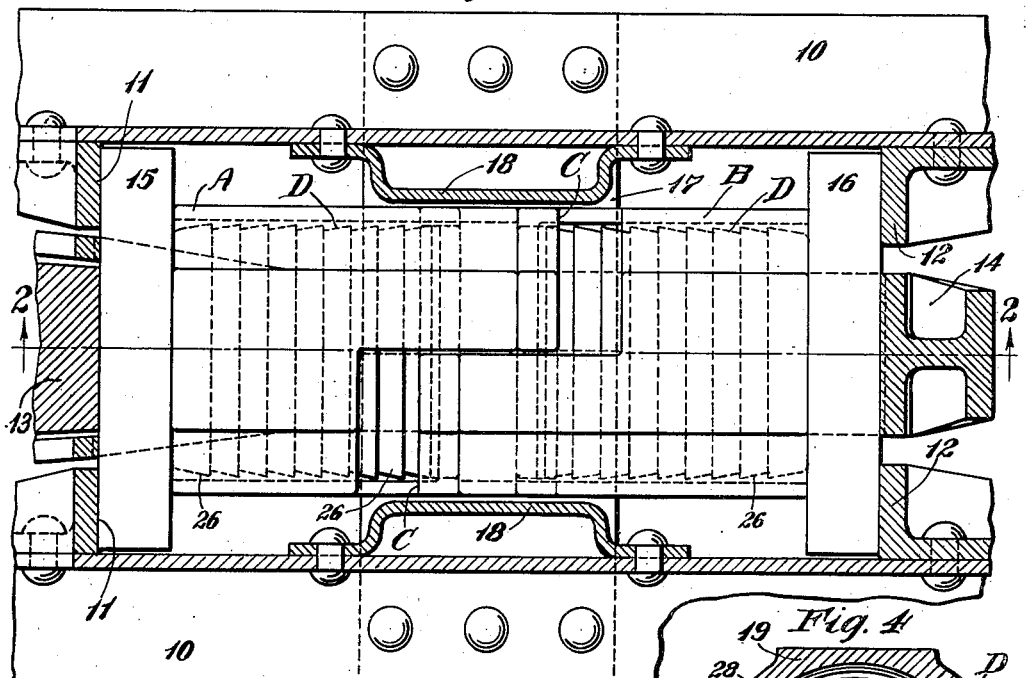
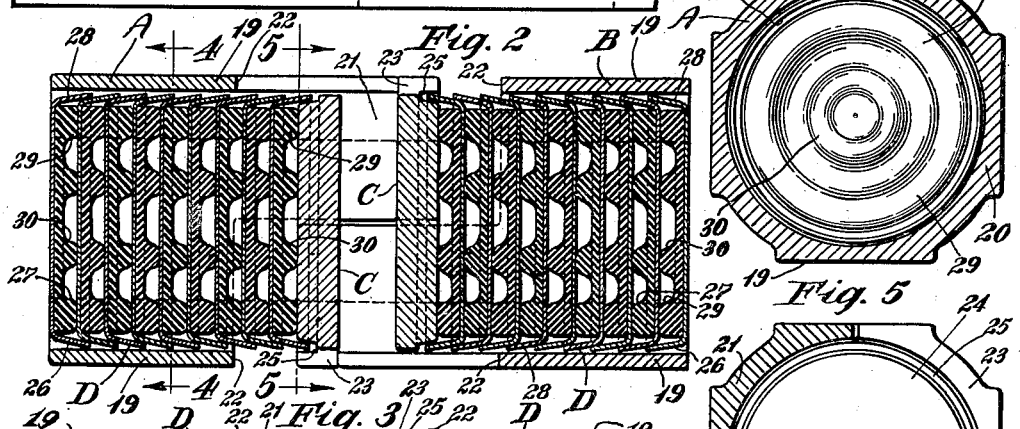
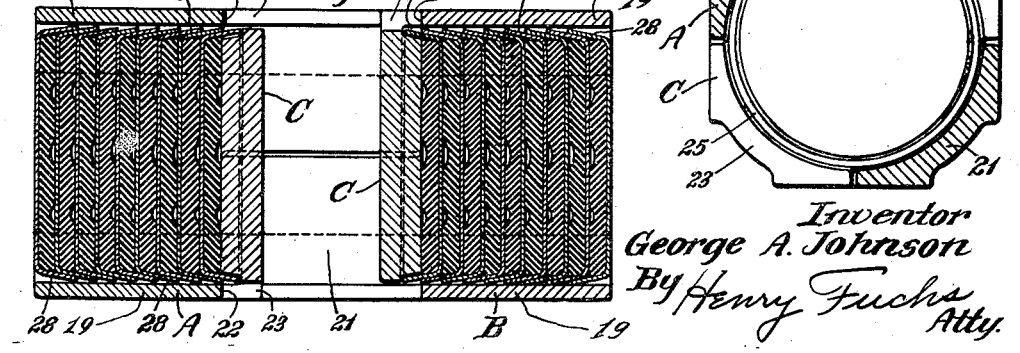
Inventor
George A. Johnson
By Henry Fuchs
Atty.

Jan. 16, 1940.  G. A. JOHNSON  2,187,156
SHOCK ABSORBING MECHANISM
Filed Dec. 24, 1937  2 Sheets-Sheet 2
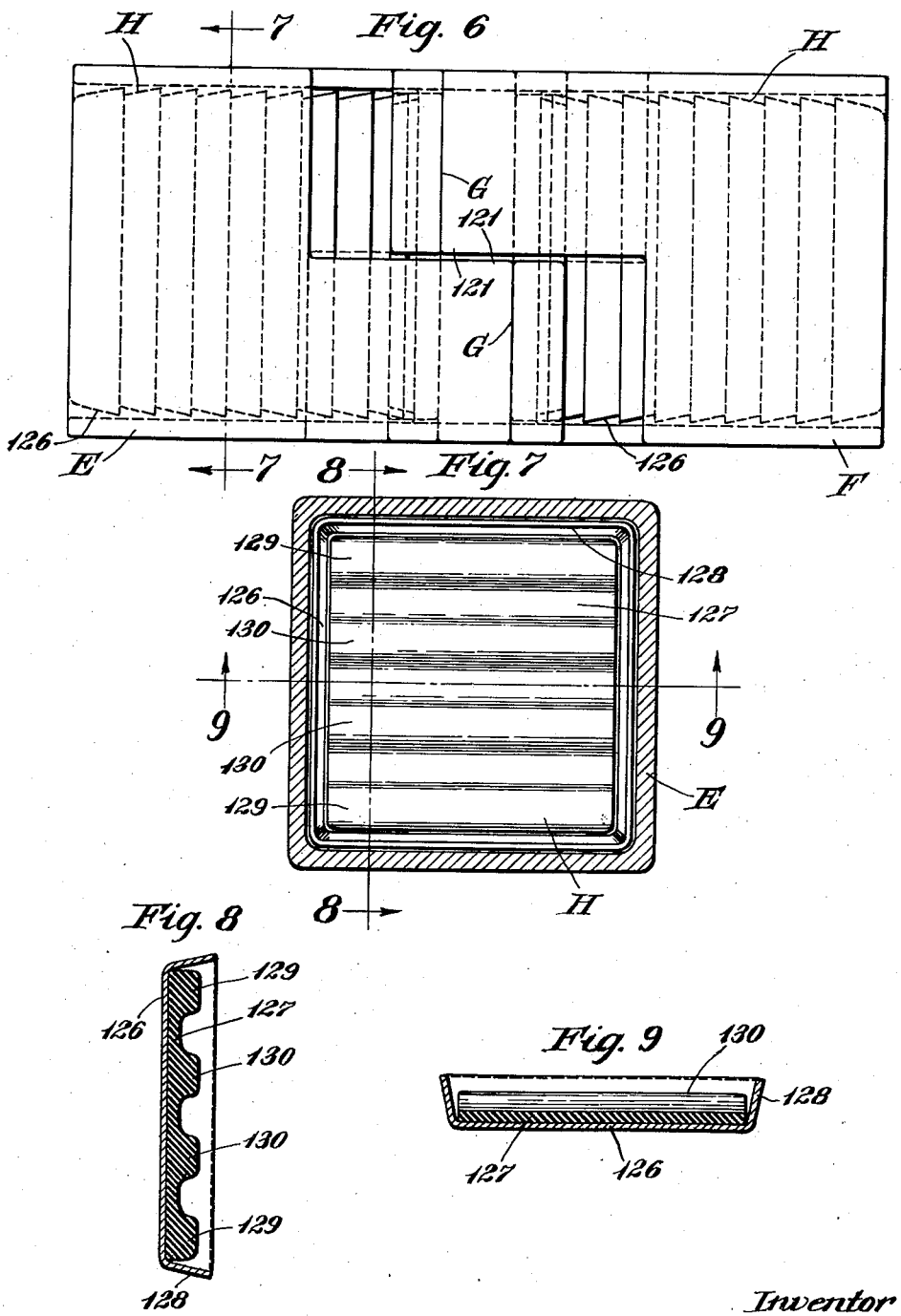
Inventor
George A. Johnson
By Henry Fuchs
Atty.

Patented Jan. 16, 1940

2,187,156

UNITED STATES PATENT OFFICE 2,187,156

SHOCK ABSORBING MECHANISM

George A. Johnson, Chicago, Ill., assignor to W. H. Miner, Inc., Chicago, Ill., a corporation of Delaware Application December 24, 1937, Serial No. 181,575

2 Claims. (Cl. 213—40)

This invention relates to improvements in shock absorbing mechanisms.

One object of the invention is to provide a shock absorbing mechanism especially adapted for railway cars, including a cushioning element of resilient yielding material, comprising a plurality of units in the form of compressible rubber mats or pads, so designed that the material of each mat is adapted to be displaced to permit distortion of the mat under compression to provide the required resilient action.

A further object of the invention is to provide in a mechanism of the character described in the preceding paragraph rubber shock absorbing units in the form of platelike pads or mats, wherein each pad is one continuous piece of material and has spaced elevated portions of rubber thereon, whereby the mat acts as a yielding backing for the elevated portions or members and the material of the elevated portions, when subjected to compression, is displaceable into the body portion of the mat and the resultant thickening of the body of the mat and flattening of the projections, due to the flow of the material thereof, is accommodated within the spaces provided by the depressions between the elevations of said mat.

Another object of the invention is to provide a rubber mat of the character specified in the preceding paragraph which is of one-piece construction, the elevated portions being in the form of integral ribs.

A still further object of the invention is to provide a shock absorbing mechanism comprising a cushioning element composed of a plurality of distortable rubber members arranged in series for simultaneous compression.

Still another object of the invention is to provide a shock absorbing mechanism for railway draft riggings including two rubber cushioning elements arranged to be compressed in tandem.

Other objects of the invention will more clearly appear from the description and claims hereinafter following.

In the drawings forming a part of this specification, Figure 1 is a horizontal sectional view through a portion of the underframe structure at one end of a railway car illustrating my improved shock absorbing mechanism in connection therewith, the shock absorbing mechanism being shown in plan. Figure 2 is a longitudinal, vertical sectional view, corresponding substantially to the line 2—2 of Figure 1 of the improved shock absorbing mechanism only. Figure 3 is a view similar to Figure 2 showing the mechanism fully compressed. Figures 4 and 5 are transverse sectional views, corresponding respectively to the lines 4—4 and 5—5 of Figure 2, Figure 4 showing one of the units of one of the cushioning elements in elevation. Figure 6 is a side elevational view of a shock absorbing mechanism of the general type illustrated in Figure 1, showing a different embodiment of the invention. Figure 7 is a transverse, vertical sectional view, corresponding substantially to the line 7—7 of Figure 6, showing one of the units of one of the cushioning elements in elevation. Figure 8 is a vertical sectional view of the unit shown in Figure 7, said sectional view corresponding substantially to the line 8—8 of Figure 7. Figure 9 is a horizontal sectional view of the unit shown in Figure 7, said sectional view corresponding substantially to the line 9—9 of Figure 7 and being taken in the direction indicated by the arrows.

In said drawings, referring first to the embodiment of the invention illustrated in Figures 1 to 5 inclusive, 10—10 indicates the longitudinally extending center or draft sills of a railway car underframe structure having the usual top and bottom flanges, the flanges at the bottom of the sills only being shown in Figure 1. On the inner sides the sills are provided with front and rear stop lugs 11—11 and 12—12 commonly employed in draft riggings. The rear end portion of the usual coupler shank is indicated by 13, to which is operatively connected a yoke 14 of well-known construction. My improved shock absorbing mechanism and cooperating front and rear followers 15 and 16 are disposed within the yoke, the followers 15 and 16 cooperating respectively with the front and rear stop lugs 11—11 and 12—12 in the usual manner. A saddle plate 17, secured to the bottom flanges of the sills 10—10, underlies the yoke 14 and supports the latter and the parts contained therein. The sills 10—10 are also provided with guides 18—18 secured to the inner sides thereof which maintain the shock absorbing mechanism centered between the sills.

My improved shock absorbing mechanism proper, as disclosed in Figures 1 to 5 inclusive, is disposed within the yoke 14 between the front and rear followers 15 and 16 and comprises broadly front and rear casings A and B, intermediate followers C—C, and front and rear cushioning elements D—D.

The casings A and B which are preferably in the form of steel castings are of substantially identical design but are reversely arranged. Each of said casings comprises spaced horizontally disposed top and bottom walls 19—19 and spaced vertical side walls 20—20. The four corners of each casing are cut away, as clearly shown in Figures 4 and 5. The outer ends of the casings are open, as shown, and bear respectively on the front and rear followers 15 and 16. Each casing is also open at the opposite or inner end. The interior of each casing is of cylindrical cross section and provides a pocket in which the corresponding cushioning element D is accommodated. At its inner end, that is, the end remote from the main follower on which it bears, each casing is cut away or recessed at diagonally opposite top and bottom corners, as shown most clearly in Figure 5, providing a pair of longitudinally extending top and bottom arms at the inner end of the casing. As shown in Figure 5, the cut away portions include slightly more than half of the horizontal and vertical walls of the casing. The two arms 21—21 have concave inner surfaces which are continuations of the inner surface of the corresponding pocket. The outer surface of each arm 21 corresponds in contour to the corresponding outer surface of the casing. The transverse inner walls of the cut away portions between the arms 21—21 provide limiting stop shoulders 22—22 for a purpose hereinafter described. The two casings are reversely arranged end to end, that is, with the arms 21—21 of one casing projecting inwardly toward the other casing. The arms 21—21 of one casing are slidingly engaged within the openings between the arms 21—21 of the other casing.

The two intermediate followers C—C are of like construction, each follower being in the form of a relatively heavy, substantially disclike plate having radial lugs or extensions 23—23 at diametrically opposite sides thereof, corresponding in outline and shape to the end faces of the corresponding arms 21—21 of the opposed casing and adapted to be engaged by the ends of said arms. The disclike body portion of each follower C, between the lugs 23—23, is of circular outline, the diameter of the circular portion of the disc being slightly less than the diameter of the cylindrical openings of the casings A and B. Each follower C is slidably disposed between the arms of the corresponding casing, the lugs 23—23 being slidably disposed in the openings between the arms of said casing and in abutment with the arms 21—21 of the other casing. As shown most clearly in Figure 2, each intermediate follower C is provided with a cylindrical projection or boss 24 in the form of a truncated cone on the side thereof opposite to that engaged by the outer ends of the arms 21—21. Each follower C also presents grooves 25—25 between the boss 24 and the lugs 23—23 of said follower, said grooves being concentric with the projecting boss 24.

The two cushioning elements D—D are disposed respectively within the casings A and B between the main follower 15 and the front intermediate follower C, and the main follower 16 and the rear intermediate follower C, the cushioning element D of the casing A bearing at opposite ends on the main follower 15 and the intermediate follower C nearest the front end of the mechanism and the cushioning element of the casing B bearing at opposite ends on the main follower 16 and the intermediate follower C nearest the rear end of the mechanism.

Each cushioning element D comprises a gang of units arranged in series, each unit being composed of a pan-shaped metal spacing member 26 and a rubber mat or pad 27 seated in the pan. The pan-shaped spacing member is in the form of a disc having a laterally extending, inclined, annular flange 28 at the outer edge thereof, the flange 28 flaring outwardly, as shown most clearly in Figures 2 and 3. These pan-shaped spacing members are disposed transversely of the corresponding casing and are of such a size that slight clearance is provided between the flanges thereof and the interior wall of the casing so that the spacing member will move freely lengthwise in said casing without any danger of binding.

The rubber mat 27 of each unit is in the form of a relatively thin disc having two concentric annular ribs 29 and 30, laterally projecting therefrom and integral therewith, the rib 29 being adjacent the outer edge portion of the disc and the rib 30 being near the center thereof. The tops of the ribs 29 and 30 are slightly rounded, as shown, and the base portions of the ribs where they merge with the main body portion of the pad are laterally enlarged, the ribs thus being of tapered cross section. The rib 29 has its outer face concentric and continuous with the outer edge face of the disclike body portion of the mat and has its inner face inclined and rounded off, as shown. The material of the mat and the inner rib 30, where the rib merges with the main body portion of the mat, is also rounded off at opposite sides of said rib. Although the ribs have been described as formed integral with the pad, it will be evident that the invention is not limited thereto and that mats comprising a rubber backing disc having annular rings mounted thereon to form the ribs may be employed in place of the structure specifically described. The mat 27 is mounted within the corresponding pan-shaped spacing member 26 with the flat side of the mat seated on the bottom wall of said member. These mats may be either loosely fitted within the pan-shaped spacing members or may be secured to the bottom walls thereof by vulcanization or any other suitable means.

As shown most clearly in Figure 2, the flange 28 of each spacing member 26 is of such a depth as to extend outwardly beyond the ribs 29 and 30 of the mat 27 of the unit. Each assembled cushioning element D has the units thereof so arranged that the pan-shaped spacing members of the same are nested, that is, that the main body portion of one unit is telescoped within the annular flange portion 28 of the adjacent unit, with the bottom of the pan-shaped spacing member bearing on the ribs 29 and 30 of the mat of said adjacent unit. The units of the two cushioning elements D—D are reversely arranged, as clearly shown in Figures 2 and 3, the spacing member of the outermost unit of each element D bearing on the corresponding main follower and the mat of the innermost unit of said element bearing on the corresponding intermediate follower C, with the ribs of said mat engaging the flat end face of the boss on said intermediate follower. The boss 24 of each intermediate follower is of such a size as to be freely accommodated within the annular flange 28 of the spacing member of the adjacent unit of the cushioning element and the flange 28 is also freely accommodated in the grooves 25—25 of said follower. As will be evident, the boss of each intermediate follower C serves to center the same with respect to the corresponding cushioning element and the nested relation of the units composing said element effect centering of the units with respect to each other. The grooves 25—25 and 25—25 of the intermediate followers C—C are of a depth, and the clearance between the side faces of the bosses 24—24 of said followers and the flanges of the adjacent units is sufficient to permit the proper amount of movement of said followers inwardly with respect to the pan-shaped spacing members of the adjacent units to assure compression of the ribs of the mats of said units to the required extent, and the side clearance between the annular flanges of the nested units of each cushioning element D is also made sufficient to permit the proper amount of relative movement thereof lengthwise of the mechanism to assure the required compression of the ribs of the mats of all of said units.

Referring next to the embodiment of the invention illustrated in Figures 6, 7, 8, and 9, the improved shock absorbing mechanism comprises broadly casings E and F, intermediate followers G—G, and front and rear cushioning elements H—H.

The casings E and F are similar to the casings A and B hereinbefore described with the exception that they are of rectangular, instead of circular, interior cross section. The intermediate followers G—G are also of rectangular shape to properly cooperate with the rectangular casings, but are otherwise similar to the intermediate followers C—C hereinbefore described, and are arranged in a similar manner, being engaged respectively by projecting arms 121—121 and 121—121 of the front and rear casings.

The cushioning elements H—H correspond to the elements D—D hereinbefore described and, with the exception that the units thereof are of rectangular instead of circular shape, are similar to the elements D—D. The rectangular units of the cushioning elements H—H are similarly arranged to the units of the elements D—D, the same being nested. Each unit comprises a pan-shaped metal spacing member 126 and a rubber pad or mat 127, the spacing member being of rectangular outline and having laterally projecting, inclined flanges 128—128 at the four edges thereof. The mat 127 of each unit is also of rectangular outline and is seated in the pan-shaped member. As shown, the mat 127 is provided with transverse, spaced, projecting ribs which are continuous and are formed integral with the body of the mat, said ribs being preferably four in number and being indicated by 129—129 and 130—130 respectively. The ribs 129—129 are located at opposed side edges of the mat and correspond in cross section with the ribs 29 hereinbefore described, and the ribs 130—130, which are disposed between the ribs 129—129, correspond in cross section to the ribs 30 hereinbefore described.

As will be evident, the shock absorbing mechanism shown in Figures 6, 7, 8, and 9 is disposed within the yoke of the draft rigging in a manner similar to the mechanism disclosed in Figures 1 to 5 inclusive, and cooperates in a like manner with the front and rear followers of said rigging.

In the operation of both forms of my improved shock absorbing mechanism, the mechanism is compressed between the front and rear followers of the draft rigging as the followers are moved relatively toward each other in either buff or draft. In a buffing action the coupler forces the front follower 15 inwardly compressing the mechanism against the rear follower 16 which at that time is held stationary by the rear stop lugs 12—12. In a draft action the yoke is pulled outwardly by the coupler, carrying the rear follower 16 therewith, and the mechanism is compressed against the front follower 15 which at this time is held stationary by the front stop lugs 11—11.

Referring to the mechanism shown in Figures 1 to 5 inclusive, as the front follower 15 moves rearwardly in buff, the front casing A of the shock absorbing mechanism is forced rearwardly therewith and the rear intermediate follower C is also forced to move rearwardly by the arms 21—21 of the front casing, which arms are in engagement with said follower. The cushioning elements D—D of the front and rear casings are thus compressed respectively between the front follower 15 and the front intermediate follower C, which at this time is stationary, and the rear follower 16 and the rear intermediate follower C, the front intermediate follower being held against rearward movement by the abutting arms 21—21 of the casing B, which casing is held stationary through the rear follower 16 on which it bears. In draft, the operation is reversed, the rear casing B being moved forwardly by the rear follower 16 and the front casing being held stationary by the front follower 15, the front intermediate follower C which moves with the casing B compressing the front cushioning element against the front follower 15, and the rear follower 16 compressing the rear cushioning element against the rear intermediate follower, which at this time is held stationary by the arms 21—21 of the front casing A.

As the cushioning elements D—D are compressed between the corresponding main and intermediate followers, as the parts approach the position shown in Figure 3, the rubber mats 27—27 thereof are compressed or flattened out between the metal spacing members 26—26, thereby distorting the mats by depressing the ribs 29 and 30 thereof and forcing the material of said ribs and body portions of the mats to be displaced or flow into the spaces between said ribs.

As is well known that rubber is substantially incompressible, the material of the ribs 29 and 30 must be displaced during compression of the same, causing the material of the mat to flow, thereby effecting distortion of the mat as hereinbefore pointed out. The compression of the mechanism is limited by engagement of the intermediate followers C—C with the limiting stop shoulders 22—22 of the front and rear casings A and B, as shown in Figure 3, whereby the casings A and B, together with the intermediate followers C—C act as a solid column to transmit the pressure between the front and rear main followers 15 and 16, thus preventing undue compression of the rubber mats.

When the actuating force is reduced, after compression of the mechanism in either buff or draft, the tendency of the distorted rubber mats to return to their normal shape causes the cushioning elements to expand, thereby returning the parts to the normal full released position shown in Figures 1 and 2.

The operation of the mechanism shown in Figures 6, 7, 8, and 9 is substantially the same as that of the mechanism shown in Figures 1 to 5 inclusive, the cushioning elements being compressed between the front, rear, and intermediate followers in both buff and draft, thus forcing the transverse ribs 129—129 and 130—130 of the rubber mats against the adjacent spacing members and flattening the ribs of the mats in a manner similar to the flattening of the ribs of the mats shown in Figures 1 to 5 inclusive.

While the cushioning elements have been shown and described as employed in a tandem type of gear, the invention is not limited to such use and these cushioning elements may be employed in any other type of gear wherein compressible cushioning elements are used to absorb shocks.

From the preceding description taken in connection with the drawings, it will be evident that by the use of my improved rubber cushioning means, which is in the form of a ruber mat having ribs thereon, a decided advantage is obtained over rubber cushioning means now in general use involving rubber plugs, blocks or bars backed by metal or other unyielding supporting members in that the ribs of my improved construction being backed by a rubber cushion which is continuous therewith, flow of the material is permitted, thereby overcoming the destructive effect caused by mushrooming of rubber members which is unavoidable in the known constructions hereinbefore referred to because in such constructions the rubber member is directly backed by unyielding supporting members.

I have herein shown and described what I now consider the preferred manner of carrying out my invention, but the same is merely illustrative and I contemplate all changes and modifications that come within the scope of the claims appended hereto.

I claim:

1. In a shock absorbing mechanism, the combination with a casing of tubular cross section; of a gang of cushioning units in said casing arranged in series lengthwise of the casing, said units corresponding in contour to the cross sectional shape of the interior of said casing and fitting said interior, each unit including a flat rubber mat disposed transversely of said casing, said mat comprising a continuous, imperforate piece of material, said mat having spaced raised ribs on one side thereof, the opposite side of said mat presenting a continuous flat surface, and a flat metal backing plate on one flat side of which the flat side of said mat is seated and on the other flat side of which the ribs of the adjacent unit bears, said plate having flanges at its outer edges overhanging said mat and closing the space between adjacent plates; and follower means at opposite ends of said casing having pressure transmitting engagement with said gang of units.

2. In a shock absorbing mechanism, the combination with a casing; of follower members at opposite ends of said casing, said follower members being relatively movable toward and away from each other; and a cushioning element within said casing interposed between said followers, said cushioning element including a gang of transversely disposed flat imperforate rubber mats arranged in series and flanged flat metal spacing plates alternated with said mats, each mat having a plurality of laterally spaced, raised, projecting ribs thereon backed by the body portion of said mat, the flanges of each spacing plate projecting beyond said ribs of the corresponding mat in overhanging relation to the adjacent spacing plate and closing the space between the adjacent spacing plates.

GEORGE A. JOHNSON.